United States Patent Office.

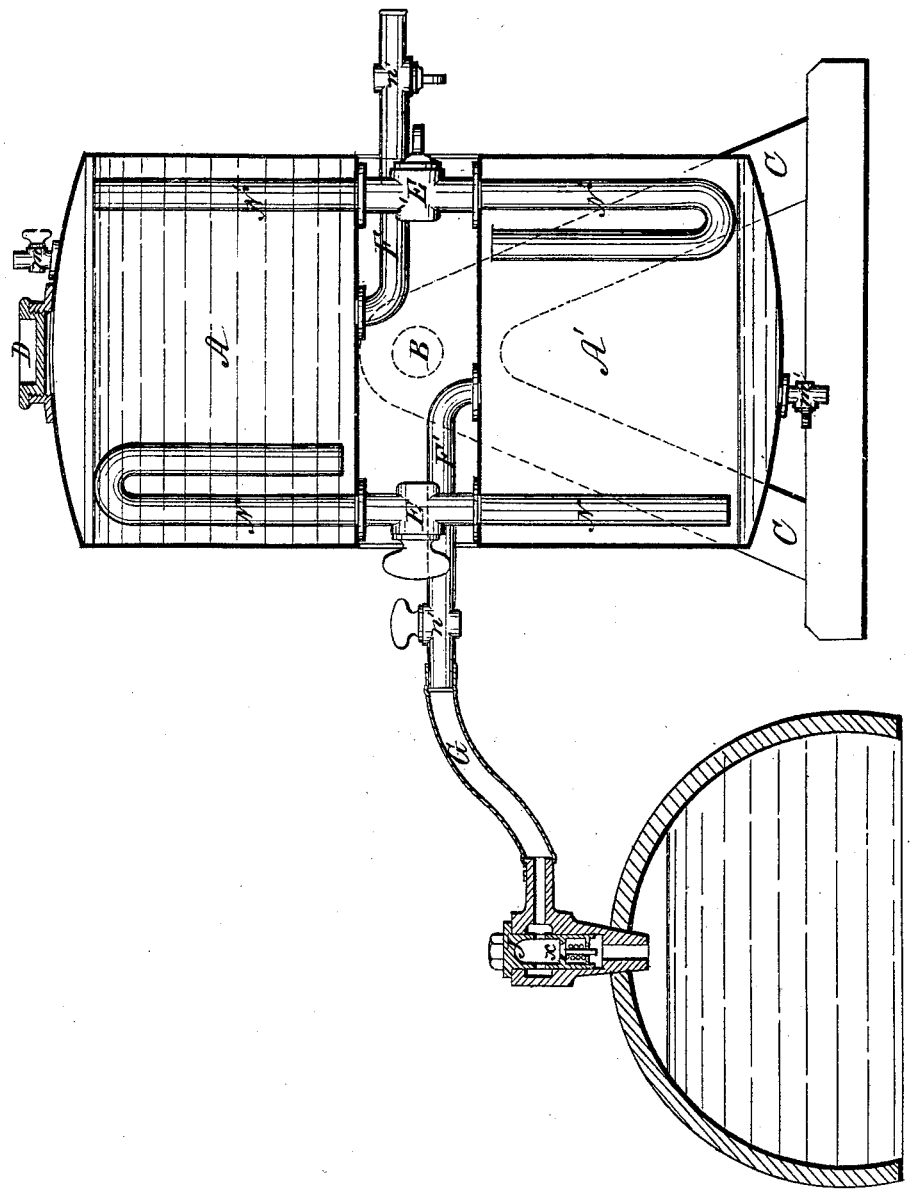

WILLIAM DIETRICHSEN, OF NEWARK, NEW JERSEY.

Letters Patent No. 90,349, dated May 25, 1869.

IMPROVED APPARATUS FOR PRESERVING BEER.

The Schedule referred to in these Letters Patent and making part of the same.

*To all whom it may concern:*

Be it known that I, WILLIAM DIETRICHSEN, of Newark, in the State of New Jersey, have invented a new and useful Apparatus for Preserving Beer; and I do hereby declare that the following is a full and exact description of the same, reference being had to the accompanying drawings, and to the letters of reference marked thereon.

The nature of my invention consists in supplying air into a beer-barrel as fast as the beer is withdrawn out of the same, and, at the same time, prevent the escape of the carbonic-acid gas out of said barrel, whereby beer may be preserved for any length of time after the barrel has been tapped.

When a barrel of beer is tapped, the bung-hole must be opened to admit a sufficient quantity of air into the barrel, to prevent the formation of a vacuum in the same; but, by this opening of the bung-hole, while the air is admitted the carbonic-acid gas is at liberty to escape freely, destroying thereby, in a very short time after the barrel is tapped, the good qualities of the beer.

My apparatus consists of two air-tight chambers, or vessels, A A', of equal capacity, fastened together in any convenient manner, and provided with a suitable bearing, B, resting in a frame, C, and capable of turning around on its bearings.

The chamber A is provided with a suitable opening, D, closed by a screw-cap, or any other contrivance for the purpose of filling said chamber with water.

The two chambers are connected together by pipes, N and N', provided with cocks, E and E'.

To the ends of each chamber A and A', nearest to the bearing B, pipes, F and F', are fastened, provided with suitable cocks, $n$ $n'$, and arranged so as to allow a flexible tube, G, to be attached to the ends of either the pipe F or F'.

On the outer ends of the chambers A and A', small air-cocks, $m$ and $m'$, are fastened.

On the end of the flexible tube G, a plug, J, is fastened, provided with a small check-valve, $x$.

The operation is as follows:

All cocks being shut, the chamber A is filled with water through the opening D, when this opening is closed tight, and the air-cock $m$ opened. The plug J is then driven into the top of a beer-barrel to be tapped, and the other end of the flexible tube G connected with the end of the pipe F' attached to the inner bottom of the chamber A'. The cocks E and $n'$ are then opened. The valve $x$ in the plug J will be kept shut by the pressure of the gases contained in the beer-barrel.

The water in the chamber A will pass through the pipe N, as soon as the cock E is opened, into the chamber A', compressing thereby the air contained in said chamber, and forces the air out of this chamber A', through the pipe F', into the beer-barrel, as fast as the beer is withdrawn out of the barrel, without allowing any escape of the carbonic-acid gas, or any other gases contained in said barrel.

When the water has all passed from the chamber A into the chamber A', the cocks E, $n'$, and $m$ are shut, the flexible tube G is disconnected from the pipe F', and the apparatus turned around its centre B, so that the chamber A' will come on the top.

The flexible tube G is then connected with the end of the pipe F, and the cocks $m'$, $n$, and E', opened, when the water, now contained in the chamber A', will pass into the chamber A, displacing the air now contained in this chamber A, compressing and forcing said air through the pipe F into the beer-barrel, in the same manner as above described.

The pipes N and N' are arranged to prevent any noise from the water falling from one chamber into the other, and may be dispensed with, and only one connection made between the two chambers, provided with a suitable cock.

What I claim as my invention, and desire to secure by Letters Patent, is—

The construction of two chambers, or vessels, A and A', connected together by a pipe, or pipes provided with suitable cocks, and provided with escape-pipes, F and F', the whole being combined and arranged to turn on its axis B, and operating in the manner and for the purpose described.

W. DIETRICHSEN.

Witnesses:
HENRY E. ROEDER,
ULYSSES BAKER.